(12) United States Patent
Lee et al.

(10) Patent No.: US 11,205,813 B2
(45) Date of Patent: Dec. 21, 2021

(54) MANUFACTURING METHOD OF PROTON BATTERY AND PROTON BATTERY MODULE

(71) Applicants: YUAN ZE UNIVERSITY, Taoyuan (TW); HOMYTECH GLOBAL CO., LTD., Taoyuan (TW)

(72) Inventors: Chi-Yuan Lee, Taoyuan (TW); Chia-Hung Chen, Taoyuan (TW); John-Shong Cheong, Taoyuan (TW)

(73) Assignees: YUAN ZE UNIVERSITY, Taoyuan (TW); HOMYTECH GLOBAL CO., LTD., Taoyuan (TW)

( * ) Notice: Subject to any disclaimer, the term of this patent is extended or adjusted under 35 U.S.C. 154(b) by 201 days.

(21) Appl. No.: 16/427,928

(22) Filed: May 31, 2019

(65) Prior Publication Data

US 2020/0028225 A1   Jan. 23, 2020

(30) Foreign Application Priority Data

Jul. 20, 2018   (TW) .................................. 107125146

(51) Int. Cl.
| | |
|---|---|
| *H01M 12/08* | (2006.01) |
| *H01M 4/96* | (2006.01) |
| *H01M 4/88* | (2006.01) |
| *H01M 4/583* | (2010.01) |
| *H01M 4/60* | (2006.01) |
| *H01M 4/02* | (2006.01) |
| *H01M 4/86* | (2006.01) |
| *H01M 4/24* | (2006.01) |

(52) U.S. Cl.
CPC ........... *H01M 12/08* (2013.01); *H01M 4/583* (2013.01); *H01M 4/602* (2013.01); *H01M 4/881* (2013.01); *H01M 4/96* (2013.01); *H01M 4/242* (2013.01); *H01M 4/8825* (2013.01); *H01M 2004/027* (2013.01); *H01M 2004/028* (2013.01); *H01M 2004/8684* (2013.01); *H01M 2004/8689* (2013.01)

(58) Field of Classification Search
None
See application file for complete search history.

(56) References Cited

U.S. PATENT DOCUMENTS

| | | | |
|---|---|---|---|
| 9,391,348 B2 * | 7/2016 | Goldberg | ............... H01M 10/48 |
| 2008/0044771 A1 * | 2/2008 | Lee | ................... H01M 8/04082 |
| | | | 430/312 |
| 2011/0039137 A1 * | 2/2011 | Engle | .................. H01M 10/486 |
| | | | 429/90 |

(Continued)

*Primary Examiner* — Jeremiah R Smith
(74) *Attorney, Agent, or Firm* — Li & Cai Intellectual Property (USA) Office

(57) ABSTRACT

A manufacturing method of a proton battery and a proton battery module are provided. The manufacturing method of the proton battery includes the steps of providing a positive electrode, a negative electrode, and a polymer exchange membrane, and assembling the positive electrode, the negative electrode, and the polymer exchange membrane, in which the polymer exchange membrane is interposed between the positive electrode and the negative electrode. The step of providing the negative electrode at least includes forming a carbon layer on a substrate, and performing a polarization process on the carbon layer.

8 Claims, 6 Drawing Sheets

(56) References Cited

U.S. PATENT DOCUMENTS

| | | | |
|---|---|---|---|
| 2013/0211158 A1* | 8/2013 | Romanos | F17C 11/007 585/2 |
| 2015/0030931 A1* | 1/2015 | Takahata | H01M 4/587 429/231.8 |
| 2015/0221929 A1* | 8/2015 | Lu | H01M 4/624 429/218.1 |
| 2015/0221987 A1* | 8/2015 | Yawata | H01M 4/485 429/338 |
| 2016/0028102 A1* | 1/2016 | Bae | H01M 10/04 429/90 |
| 2016/0115606 A1* | 4/2016 | Lee | C25B 15/02 204/252 |
| 2016/0329560 A1* | 11/2016 | Young | H01M 10/345 |
| 2016/0359187 A1* | 12/2016 | Lee | H01M 8/04582 |
| 2017/0092956 A1* | 3/2017 | Lee | H01M 4/661 |

\* cited by examiner

MANUFACTURING METHOD OF PROTON BATTERY AND PROTON BATTERY MODULE

CROSS-REFERENCE TO RELATED PATENT APPLICATION

This application claims the benefit of priority to Taiwan Patent Application No. 107125146, filed on Jul. 20, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a manufacturing method of proton battery and a proton battery module, and more particularly to manufacturing method of a rechargeable proton battery and a rechargeable proton battery module.

BACKGROUND OF THE DISCLOSURE

In order to reduce carbon dioxide emissions and respond to global climate change issues, many counties have dedicated efforts to developing low cost and pollution-free renewable energy to replace petroleum fuel and eliminate the impacts on the environment.

Compared to other renewable energies, hydrogen fuel is relatively clean and harmless to environment, and is thus considered by some as the energy carrier with the most potential. The operating principle of a fuel cell is applying an electrochemical reaction in which the hydrogen reacts with the oxygen to form water and release energy. Essentially, the fuel cell can be considered as a device in which a reverse reaction of water electrolysis is applied. However, the conventional full cell is non-rechargeable, and hydrogen has to be continuously supplied to generate electric power.

Compared to the fuel cell, the lithium ion battery is rechargeable and generates electric power through the transportation of lithium ions between a positive electrode and a negative electrode. Specifically, during a discharging process, the lithium ions move from the negative electrode to the positive electrode while electrons flow through an external circuit and are supplied to a load. During a charging process, the lithium ions move from the positive electrode back to the negative electrode. However, the material of the positive electrode of the lithium ion battery is usually lithium compound, such as $LiCoO_2$, $LiMn_2O_4$, $LiNiO_2$, $LiFePO_4$, and so on. Since the content of lithium is relatively rare and the price of lithium is higher, it is difficult to further lower the price of the lithium ion battery.

SUMMARY OF THE DISCLOSURE

In response to the above-referenced technical inadequacies, the present disclosure provides a rechargeable proton battery, in which a polarized carbon layer is used to be a hydrogen-storage material so as to increase a diffusion velocity of hydrogen and the hydrogen storage capacity of the rechargeable proton battery.

In one aspect, the present disclosure provides a manufacturing method of a proton battery. The manufacturing method includes the steps of providing a positive electrode, a negative electrode and a proton exchange membrane, and assembling the positive electrode, the proton exchange membrane, and the negative electrode, in which the proton exchange membrane is disposed between the positive electrode and the negative electrode. The step of providing negative electrode at least includes forming a carbon layer on a substrate and performing a polarization process on the carbon layer.

In one aspect, the present disclosure provides a proton battery module. The proton battery module includes a proton battery, and the proton battery includes a positive electrode, a negative electrode and a proton exchange membrane disposed between the positive electrode and the negative electrode. The negative electrode includes a substrate and a polarized carbon layer disposed on the substrate.

Therefore, one of the advantages of the present disclosure is that in the manufacturing method of a proton battery and a proton battery module, a diffusion rate and depth of the hydrogen ions in the carbon layer can be increased by using the carbon layer, on which a polarization process is performed, as a hydrogen storage material. As such, the charge efficiency and the charge capacity of the proton battery can be enhanced so that the proton battery has the potential to replace the lithium ion battery.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
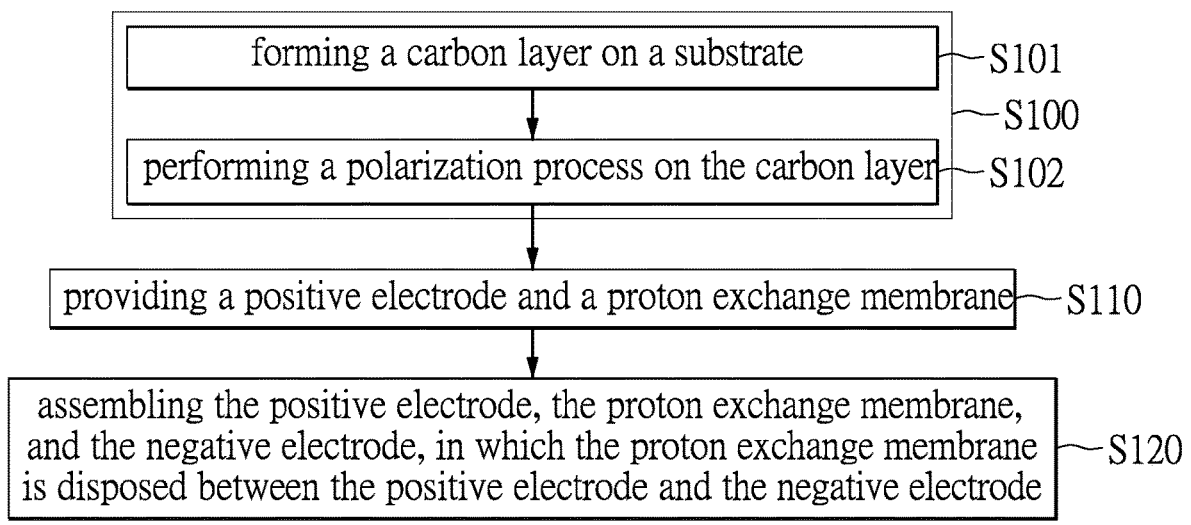
FIG. 1 is a flowchart of a manufacturing method of a proton battery according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1. FIG. 1 is a flowchart of a manufacturing method of a proton battery according to an embodiment of the present disclosure. To be more specific, a manufacturing method of a rechargeable proton battery is provided in the present disclosure and at least includes the following steps.

In step S100, a negative electrode is provided. In step S110, a positive electrode and a proton exchange membrane (PEM) are provided. In step S120, the positive electrode, the negative electrode and the proton exchange membrane are assembled, and the proton exchange membrane is disposed between the positive electrode and the negative electrode.

During a charging process, hydrogen ions are generated at the positive electrode by electrolyzing water, and transported across the proton exchange membrane. Meanwhile, the electrons flowing through an external circuit to the negative electrode can assist the combinations of the hydrogen ions and the negative electrode so that the hydrogen ions are stored in the negative electrode. During a discharging process, the operation principle of the rechargeable proton battery is similar to that of the fuel cell. That is, the hydrogen ions stored in the negative electrode are released and move to the positive electrode through the proton exchange membrane, and the electrons flow from the negative electrode to the positive electrode through the external circuit so as to generate electricity. More details of the operation principle of the rechargeable proton battery will be further explained in the following description in conjunction with the related drawings, and will be described herein.

Accordingly, the diffusion rate and diffusion depth of the hydrogen ions influence the hydrogen storage capacity of the negative electrode of the rechargeable proton battery, thereby influencing the charge efficiency and charge capacity of the rechargeable proton battery. In the embodiments of the present disclosure, the fabrication process of the negative electrode is modified to increase the diffusion rate and diffusion depth of the hydrogen ions so as to improve the charge capacity and the efficiency of the rechargeable proton battery.

Figure 2A:
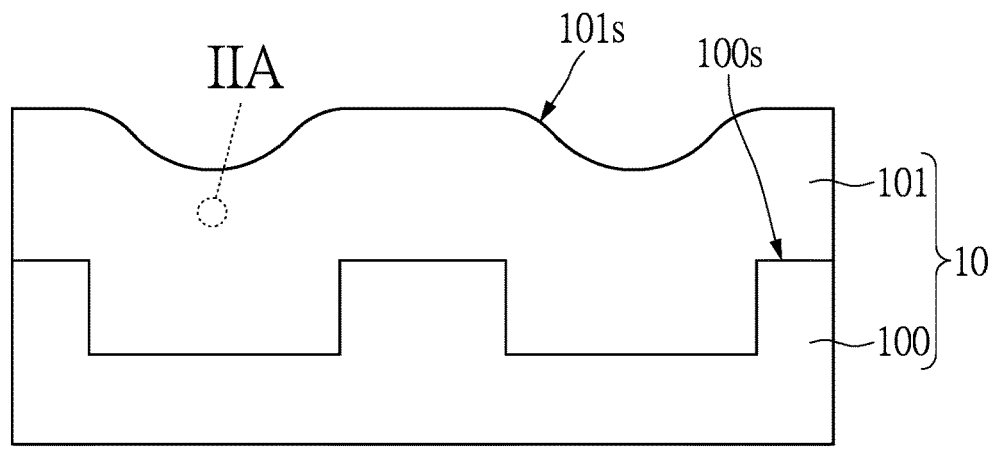
FIG. 2A is a schematic sectional view of a negative electrode of the proton battery in step S101 according to the embodiment of FIG. 1 in the present disclosure.

Reference is made to FIG. 1 and FIG. 2A, in which FIG. 2A is a schematic sectional view of a negative electrode of the proton battery in step S101 shown in FIG. 1 according to the embodiment of the present disclosure. In step S101, a carbon layer is formed on a substrate.

As shown in FIG. 2A, the substrate 100 is such as a carbon paper or a carbon cloth, and serves as a gas diffusion electrode. In the instant embodiment, the substrate 100 has a surface 100s, and the surface 100s is an uneven surface or a bumpy surface. Specifically, the uneven surface can include a curved portion, an inclined portion, a stepped portion, a recess portion, a protruding portion or any combination thereof. That is to say, a height difference between a top end of a protruding portion and a bottom end of a recess portion of the surface 100s is at least greater than 0.2 mm.

The carbon layer 101 is formed on the surface 100s of the substrate 100. Accordingly, the carbon layer 101 has an outer surface 101s that is in conjunction with the surface contour of the substrate 100. That is to say, the outer surface 101s is also an uneven surface and thus has a greater surface area so as to adsorb more hydrogen ions. Furthermore, the diffusion paths of the hydrogen ions in the carbon layer 101 can also be increased so that the diffusion rate the hydrogen ions can be improved.

Additionally, the carbon layer 101 can be a graphene layer or an activated carbon layer, in which the activated carbon layer can include a plurality of carbon fibers or carbon particles. In the instant embodiment, the carbon layer 101 is the activated carbon layer.

The fabrication process of the activated carbon layer can include a carbonization process and an activation process. In the carbonization process, a raw material is pyrolyzed at high temperature in the absence of oxygen so as to remove the moisture contained therein, and then the raw material is carbonized. The raw material usually includes organic material and a binder. In one embodiment, the raw material for fabricating the activated carbon layer includes phenolic resin and 10 wt % of polytetrafluoroethylene (PTFE) binder. Furthermore, the raw material can be pyrolyzed by a chemical solution, which can be 6M potassium hydroxide electrolyte solution.

The activation process can be a physical activation process or a chemical activation process. During the physical activation process, atoms presented in a surface layer of the activated carbon layer can be partially removed by water vapor, carbon dioxide or oxygen so that the activated carbon layer can have a higher porosity, a larger surface area and higher hydrogen adsorption rate. During the chemical activation process, the porosity of the activated carbon layer can be increased by using chemical substance, such as one of an acidic solution and an alkaline solution, thereby increasing the surface area and the adsorption rate of hydrogen to the activated carbon layer.

In one embodiment, during the chemical activation process, compared to the acidic solution, the alkaline solution makes the activated carbon layer have higher hydrogen adsorption rate. However, the fabrication process of the activated carbon layer is not limited to the examples provided herein.

Figure 2B:
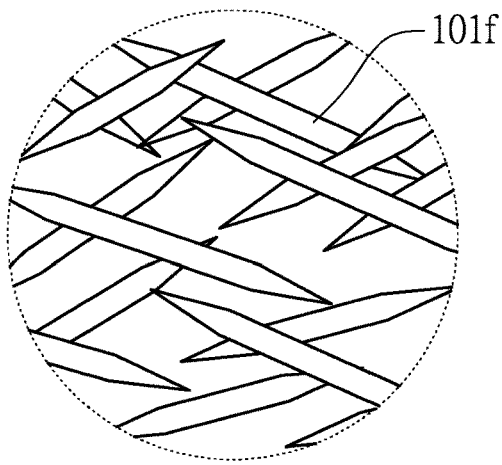
FIG. 2B is a partially enlarged view of the area IIA of FIG. 2A.

In the instant embodiment, the activated carbon layer including a plurality of carbon fibers is exemplified for description. Reference is made to FIG. 2B, the carbon layer 101 formed on the substrate 100 is the activated carbon layer including a plurality of carbon fibers 101*f*, and the carbon fibers 101*f* are randomly interlaced with one another. In other words, the carbon fibers 101*f* of the carbon layer 101 are non-directionally arranged.

Figure 2C:
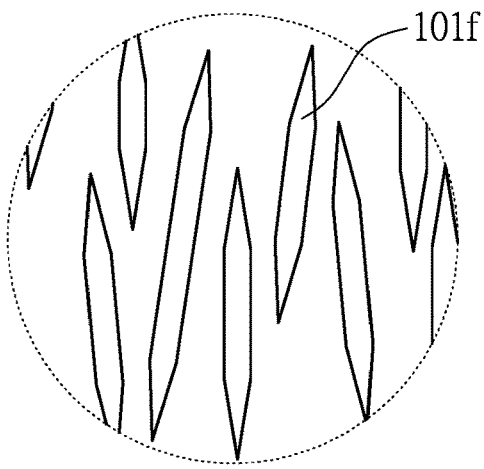
FIG. 2C is a partially enlarged view of the negative electrode of the proton battery in step S102 according to the embodiment of FIG. 1 in the present disclosure.

Reference is made to FIG. 1 and FIG. 2C. In the instant embodiment, after the carbon layer 101 is formed, the manufacturing method proceeds to step S102, i.e., a polarization process is performed on the carbon layer so that the atoms of the carbon layer are arranged along a specific direction.

The activated carbon layer including the carbon fibers are exemplary in the embodiment. As shown in FIG. 2C, after the polarization process, the carbon fibers 101*f* can be forced to be arranged along a specific direction. To be more specific, the axial direction of each of the carbon fibers 101*f* is substantially parallel to a thickness direction of the carbon layer 101.

During the polarization process, an electric field or a magnetic field is applied to the carbon layer 101 so as to force the carbon fibers 101*f* in the carbon layer 101 to be arranged along a specific direction. In one embodiment, the polarization process is applying an electric field to the carbon layer 101, and a strength of the electric field ranges from 50 V/m to 3000 V/m.

It should be noted that as shown in FIG. 2B, before the polarization process, the carbon fibers 101*f* of the carbon layer 101 are non-directionally arranged. Accordingly, the interlaced carbon fibers 101*f* that have adsorbed the hydrogen ions at the surface layer may block the diffusion of the other hydrogen ions into the carbon layer 101, thereby decreasing the diffusion rate of the hydrogen ions. As such, most of the hydrogen ions are adsorbed to the surface layer of the carbon layer 101, and only a few of the hydrogen ions can diffuse into and be adsorbed to the interior of the carbon layer 101.

In the embodiment of the present disclosure, after the polarization process is performed on the carbon layer 101, the carbon fibers 101*f* extends substantially along the same direction, with the axial direction thereof substantially parallel to a thickness direction of the carbon layer 101. Specifically, in one embodiment, for over 90% of the amount of carbon fibers 101*f*, an angle between the axial direction of the carbon fiber 101*f* and the thickness direction of the carbon layer 101 does not exceed 45 degrees.

Accordingly, the carbon fibers 101*f* positioned at the surface layer of the carbon layer 101 may not block the diffusion of the hydrogen ions into the carbon layer 101, such that the diffusion rate and diffusion depth of the hydrogen ions can be increased. As such, the hydrogen storage capacity of the carbon layer 101 can be increased. Furthermore, since the diffusion rate of the hydrogen ions is increased, the charge velocity of the proton battery can also be enhanced.

Furthermore, in one embodiment, during the fabrication process of the negative electrode, a hydrogen sensor can be further embedded in the negative electrode so that an amount of hydrogen produced by the proton battery in a charging mode can be detected. By detecting the amount of hydrogen, the charge capacity of the proton battery can be monitored, and whether the carbon layer 101 needs to be activated again or not can be determined. The details of monitoring means will be described in the following descriptions and omitted herein.

In one embodiment, the hydrogen sensor includes a polymer film and a sensor layer formed on the polymer film, in which the polymer film can be made of polyimide.

Furthermore, during the fabrication of the sensor layer, a metal layer is formed on the polymer film. To be more specific, the metal layer can be formed by sequentially forming a chromite (Cr) layer and a gold (Au) layer on the polymer film. Thereafter, the metal layer is etched to fabricate the sensor layer with a specific pattern, and the sensor layer can be used to be electrically connected to an external circuit. The hydrogen sensor fabricated by the aforementioned process is very thin, and thus can be disposed in the interior of the carbon layer 101. In one embodiment, the hydrogen sensor can further include a protective layer which partially covers the sensor layer.

The step of forming the negative electrode can further include forming a negative side catalyst layer on the carbon layer, in which the negative side catalyst layer includes a carbon carrier and noble metal catalyst, such as platinum, distributed around the carbon carrier. When the proton battery discharges, the hydrogen oxidation reaction can be accelerated with the negative side catalyst layer to generate hydrogen ions and electrons. It should be noted that when the proton battery discharges, the carbon layer can directly release hydrogen ions and it is not necessary to continuously supply hydrogen. Accordingly, in one embodiment, the step of forming the negative side catalyst layer can be omitted.

Furthermore, the positive electrode, the negative electrode, and the proton exchange membrane can be assembled by heat lamination so that the positive electrode, the negative electrode, and the proton exchange membrane are combined with one another and jointly form an electrode assembly. The means for assembling the positive electrode, the negative electrode, and the proton exchange membrane can be any conventional technique and are not limited in the present disclosure.

Figure 3:
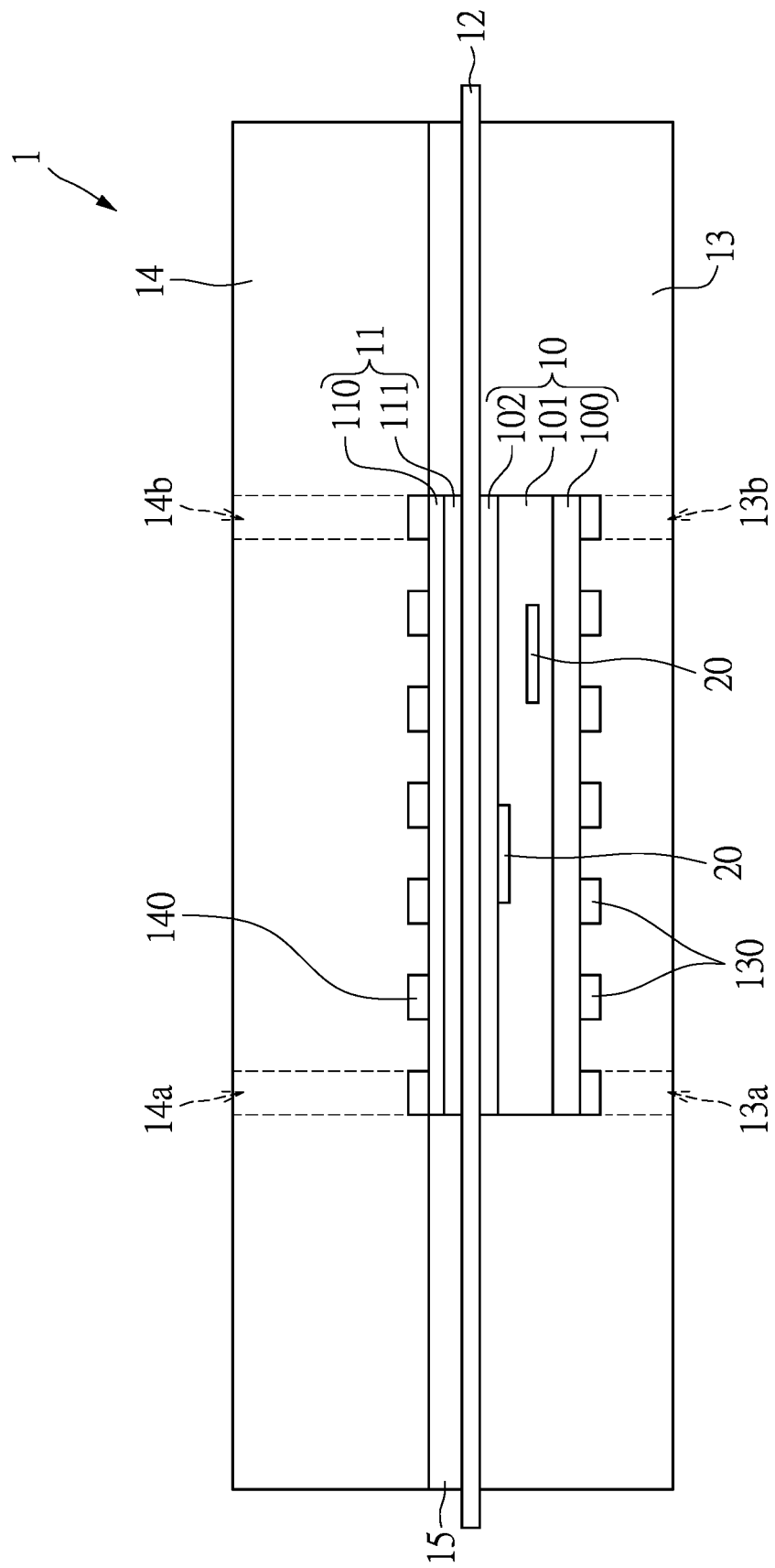
FIG. 3 is a schematic sectional view of a proton battery according to one embodiment of the present disclosure.

Reference is made to FIG. 3. FIG. 3 is a schematic sectional view of a proton battery according to one embodiment of the present disclosure. In the instant embodiment, the proton battery 1 includes a negative electrode 10, a positive electrode 11, and a proton exchange membrane 12.

As shown in FIG. 3, the negative electrode 10 includes a substrate 100 and a carbon layer 101 on which a polarization process has been performed. As mentioned above, the polarized carbon layer 101 can be a graphene layer or an activated carbon layer, and the activated carbon layer can include a plurality of carbon fibers or carbon particles.

In one embodiment, the polarized carbon layer 101 is an activated carbon layer having a plurality of carbon fibers 101*f*, and the carbon fibers 101*f* extend in substantially the same direction, as shown in FIG. 2C. Furthermore, in the instant embodiment, the negative electrode 10 further includes a negative side catalyst layer 102, and the negative side catalyst layer 102 is disposed between the carbon layer 101 and the proton exchange membrane 12.

It should be noted that in one embodiment, an activation process has been performed on the carbon layer 101 by using an acidic solution, such as sulfuric acid solution. As such, a small amount of the acidic solution remains in the carbon layer 101 so as to assist hydrogen ions to diffuse into the interior of the carbon layer 101. In the other embodiment, an activation process has been performed on the carbon layer 101 by using an alkaline solution, such as potassium hydroxide solution, and the carbon layer 101 has a small amount of the alkaline solution remaining therein.

In the instant embodiment, the positive electrode 11 includes a gas diffusion layer 110 and a positive side catalyst layer 111. The positive side catalyst layer 111 is disposed between the gas diffusion layer 110 and the proton exchange membrane 12. In one embodiment, the gas diffusion layer 110 can be a carbon paper or a carbon cloth, and the positive side catalyst layer 111 includes iridium dioxide and perfluorosulfonic acid resin. However, the present disclosure is not limited to the example provided herein.

The proton exchange membrane 12 is disposed between the positive electrode 11 and the negative electrode 10. In one embodiment, the proton exchange membrane 12 is a solid-state polymer electrolyte membrane, such as a perfluorosulfonic acid membrane. The proton exchange membrane 12 can transport protons, such as hydrogen ions H$^+$, and block the passages of gas and electrons. In the instant embodiment, the proton exchange membrane 12 is disposed between the negative side catalyst layer 102 and the positive side catalyst layer 111.

Furthermore, the proton battery 1 in one embodiment of the present disclosure further includes a negative side flow guiding plate 13, a positive side flow guiding plate 14, and a gasket 15.

The negative side flow guiding plate 13 has two first fluid openings 13a, 13b so as to allow a fluid (hydrogen) to be introduced into the negative electrode 10 or allow a fluid generated during the operation of the proton battery 1 to be released. Furthermore, an inner surface of the negative side flow guiding plate 13, i.e., the surface facing toward the negative electrode 10, is disposed with a negative side fluid channel 130 to guide a fluid flowing in or out of the negative electrode.

Similarly, the positive side flow guiding plate 14 has a second fluid opening 14a and a third fluid opening 14b. During the operation of the proton battery 1, the fluids for reaction or generated at the positive electrode 11, such as water or oxygen, can be introduced or released through the second fluid opening 14a and the third fluid opening 14b. An inner surface of the positive side flow guiding plate 14 can be disposed with a positive side fluid channel 140 to guide fluid flowing in or out of the positive electrode.

Furthermore, the gasket 15 is disposed between the negative side flow guiding plate 13 and the positive guiding plate 14 to prevent the reaction fluids in the positive side fluid channel 140 and the negative side fluid channel 130 from leakage, which may result in lower charge efficiency of the proton battery 1.

Figure 4:
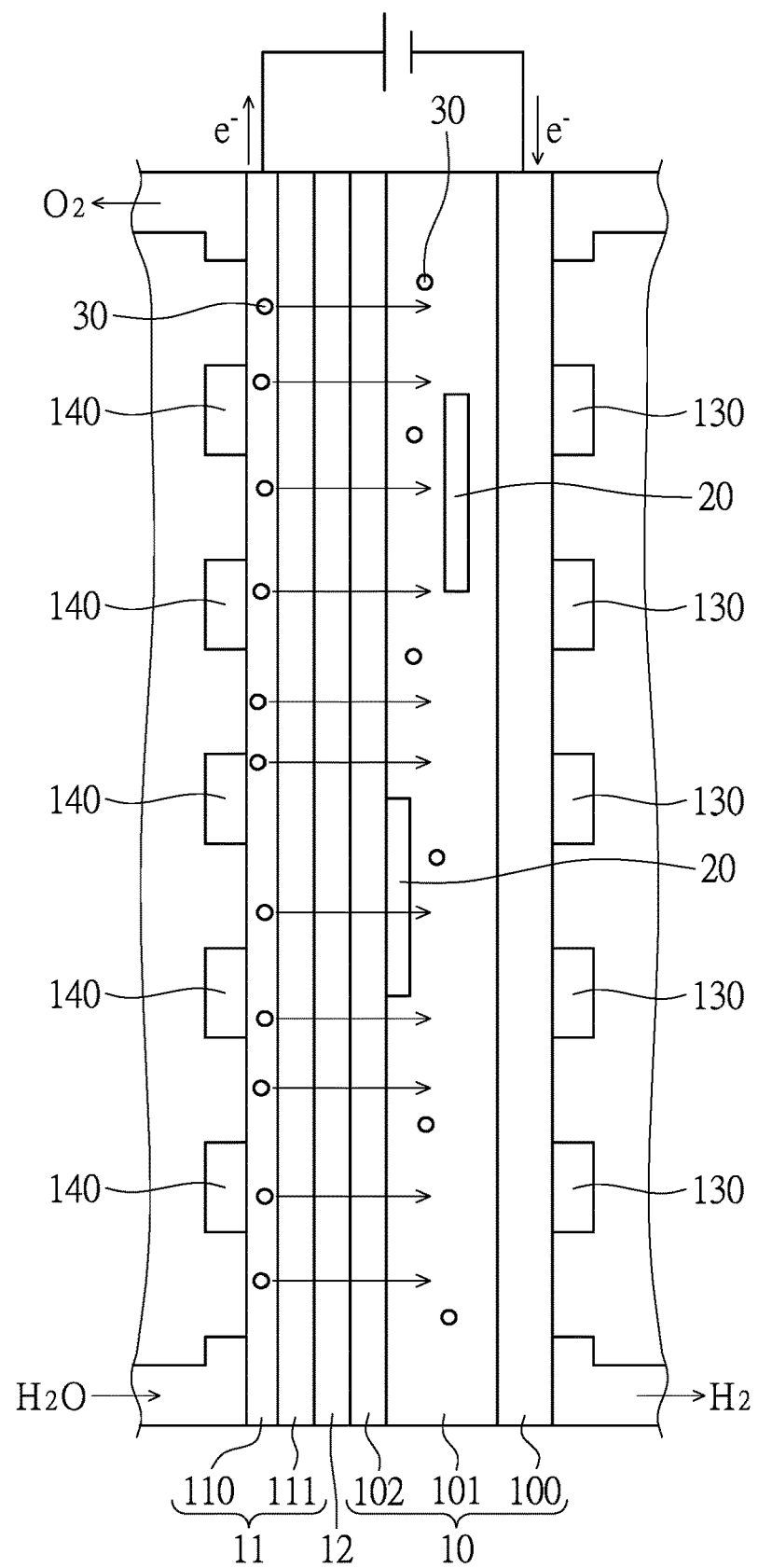
FIG. 4 is a schematic sectional view of a proton battery during a charging process according to one embodiment of the present disclosure.

Reference is made to FIG. 4, which is a schematic sectional view of a proton battery during a charging process according to one embodiment of the present disclosure. During a charging process, a voltage is applied to the proton battery 1 and water is introduced into the positive electrode 11 through the second fluid opening 14a of the positive side flow guiding plate 14. At this time, the half-reaction that occurs at positive electrode 11 can be presented as the following equation:

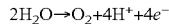

$$2H_2O \rightarrow O_2 + 4H^+ + 4e^-$$

Accordingly, the oxygen generated at the positive electrode 11 is released from the third fluid opening 14b, while the hydrogen ions migrate across the proton exchange membrane 12 and move toward the negative electrode 10. The hydrogen ions are adsorbed to the carbon layer 101 with the assistance of the electrons (e$^-$) which is supplied by the applied voltage, instead of forming hydrogen gas. The aforementioned voltage that is applied to the proton battery 1 is at least greater than 1.8V. However, when the adsorption of the hydrogen ions onto the carbon layer reaches saturation, the remaining hydrogen ions form hydrogen. The hydrogen then flows along the negative side flow guiding channel 130 and releases from the first fluid openings 13a, 13b.

Figure 5:
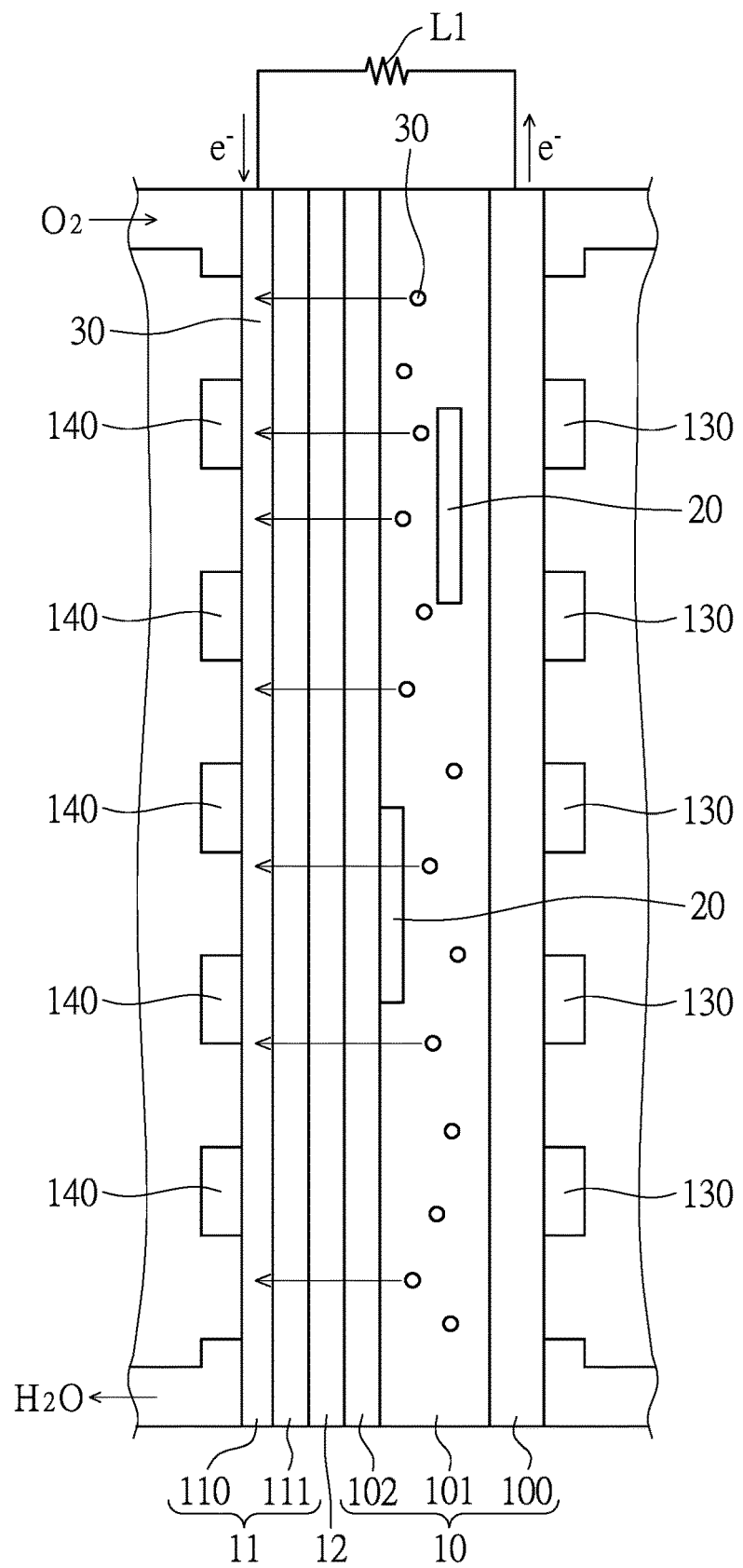
FIG. 5 is a schematic sectional view of a proton battery during a discharging process according to one embodiment of the present disclosure.

Reference is made to FIG. 5, which is a schematic sectional view of a proton battery during a discharging process according to one embodiment of the present disclosure. During a discharging process, oxygen is introduced in the positive electrode 11 through the third fluid opening 14b. The hydrogen ions adsorbed to the carbon layer 101 move across the proton exchange membrane 12 toward the positive electrode 11, while the electrons (e) flow to the positive electrode 11 through an external circuit so as to generate current flowing through a load L1.

Furthermore, the hydrogen ions moving to the positive electrode 11 react with oxygen to produce water. The water produced at the positive electrode 11 can flow out of the positive side flow guiding plate 14 through the second fluid opening 14.

Figure 6:
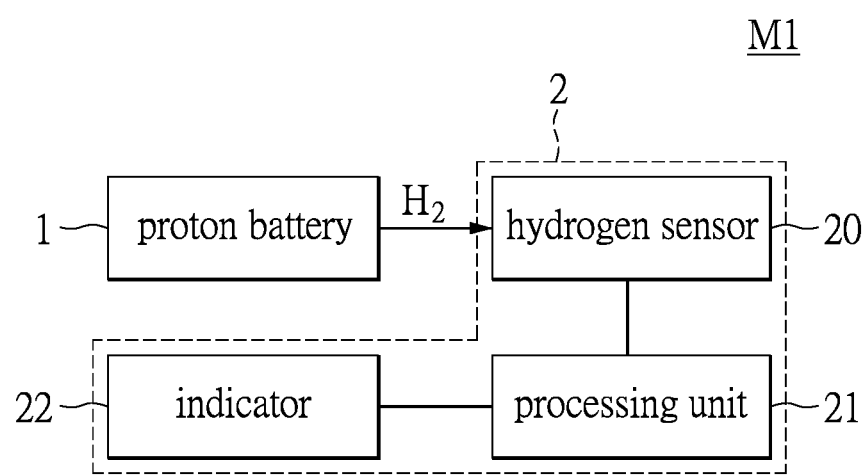
FIG. 6 is a functional block diagram of a proton battery module according to one embodiment of the present disclosure.

Reference is made to FIG. 6. In the embodiment of the present disclosure, a proton battery module M1 is also provided. The proton battery module M1 includes the proton battery 1 shown in FIG. 3 and a monitor device 2.

In the instant embodiment, the monitor device 2 includes a hydrogen sensor 20, a processing unit 21, and an indicator 22.

The hydrogen sensor 20 can be embedded in the negative electrode 10 to detect hydrogen that is not adsorbed to the polarized carbon layer 101 and then generate an electrical signal. The electrical signal can be a resistance, a voltage, or a current. The processing unit 21 is electrically connected to the hydrogen sensor 20 to receive and process the electrical signal transmitted from the hydrogen sensor 20. According to the received electrical signal, the processing unit 21 can obtain an amount of the hydrogen according to the electrical signal.

In one embodiment, the hydrogen sensor 20 includes a gas-sensitive film, which detects hydrogen by a reaction between a reduction gas (hydrogen) and the oxygen adsorbed to the surface of the gas-sensitive film. To be more specific, the hydrogen facilitates the combinations between oxygen atoms that are adsorbed to the surface of the gas-sensitive film and the electrons of the gas-sensitive film, thereby changing an electrical characteristic, such as resistance, of the gas-sensitive film.

Accordingly, the processing unit 20 can obtain the amount of hydrogen in the carbon layer 101 by measuring the resistance of the gas-sensitive film. However, the type of the hydrogen sensor 20 is not limited to the example provided herein. That is to say, by measuring at least one of a voltage, a current or a resistance of the gas-sensitive film, the processing unit 20 can obtain the amount of hydrogen.

Furthermore, the processing unit 21 can record the amounts of hydrogen in the carbon layer 101 respectively at different time points so as to determine the remaining adsorption capacity of the carbon layer 101. Specifically, the amount of hydrogen is related to the adsorption capacity of the carbon layer 101. The more hydrogen ions the carbon layer 101 adsorbs, the less the adsorption capacity of carbon layer 101 will remain. Therefore, the larger the amount of hydrogen that is detected by the monitor device 2 is, the closer the hydrogen ions 30 would approach saturation in the carbon layer 101. That is, by recording the amounts of hydrogen at different time points, the charging state of the proton battery 1 or the remaining adsorption capacity of carbon layer 101 can be detected.

Furthermore, the processing unit 21 is electrically connected to the indicator 22. When the processing unit 21 determines that the amount of hydrogen is larger than a predetermined value, the processing unit 21 controls the indicator 22 to generate an alarm signal. The indicator 22 can be a display panel, an alarm lamp, or a voice alarm.

As mentioned above, during a charging process, when the hydrogen ions in the carbon layer 101 reach saturation, the remaining hydrogen ions 30 form hydrogen. Accordingly, in one embodiment, by recording the amount of hydrogen at different time points, the processing unit 21 can determine the charge capacity of the proton battery 1. When the amount of the hydrogen is larger than the predetermined value for a predetermined time period, it represents that the hydrogen ions have reached saturation in the carbon layer 101; that is, the proton battery 1 has been completely charged. At this time, the processing unit 21 can control the indicator 22 to generate an alarm signal for reminding a user.

Additionally, after a number of times of charging and discharging cycles, the monitor device 2 can detect whether the adsorption capability of the carbon layer 101 of the negative electrode 10 decays or not due to the aging carbon layer 101. Specifically, when the charging time is less than a preset time, and the processing unit 21 detects that the amount of hydrogen is larger than the predetermined value for a predetermined time period, it represents that the carbon layer 101 has degraded. The processing unit 21 then controls the indicator 22 to generate an alarm signal to remind a user to replace the battery or perform an activation process on the proton battery.

Specifically, the impurities that are adsorbed to and present in the interior of the carbon layer 101 can be removed by introducing an acidic solution or an alkaline solution into the negative side fluid channel 130, thereby recovering the adsorption capacity of the carbon layer 101 for hydrogen ions 30. Thereafter, high purity oxygen is introduced to clean the acidic solution or the alkaline solution. For example, the aforementioned acidic solution can be sulfuric acid solution, and the alkaline solution can be potassium hydroxide solution.

Furthermore, the number of the hydrogen sensor 20 can be one or more than one. When the number of the hydrogen sensor 20 is more than one, the hydrogen sensors 20 can be embedded in the carbon layer 101 and respectively located at different positions. Accordingly, the processing unit 21 can obtain a plurality of groups of the amounts of hydrogen, and the groups of the amounts of hydrogen respectively correspond to the adsorption amounts of hydrogen ions 30 at different positions of the carbon layer 101. As such, the processing unit 21 can detect the remaining adsorption capacity of hydrogen ion 30 respectively at different positions of the carbon layer 101. The processing unit 21 can further determine whether the carbon layer 101 has degraded or not according to the groups of the amounts of hydrogen respectively detected at different positions.

In conclusion, one of the advantages of the present disclosure is that in the manufacturing method of a proton battery and a proton battery module, by performing a polarization process on the carbon layer 101," a diffusion rate and depth of the hydrogen ions in the carbon layer 101 can be increased, and the hydrogen storage capacity of the carbon layer 101 can be improved. As such, the charge efficiency and the charge capacity of the proton battery 1 can be enhanced so that the proton battery has the potential to replace the lithium ion battery.

Furthermore, the proton battery module M1 includes the monitor device 2 to detect the charging state of the proton battery 1 and determine whether the negative electrode 10 is degraded or not, thereby reminding a user to change the battery or perform an activation process on the proton battery 1.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A manufacturing method of a proton battery comprising:
   providing a negative electrode, wherein the step of providing the negative electrode at least includes:
      forming a carbon layer on a substrate; performing a polarization process on the carbon layer; and
      embedding at least one hydrogen sensor in the negative electrode, wherein the hydrogen sensor includes a polymer film and a sensor layer formed on the polymer film, and wherein the step of fabricating the sensor layer includes:
   forming a metal layer and etching the metal layer to fabricate the sensor layer with a specific pattern;
   providing a positive electrode and a proton exchange membrane; and
   assembling the positive electrode, the proton exchange membrane, and the negative electrode, wherein the proton exchange membrane is disposed between the positive electrode and the negative electrode.

2. The manufacturing method according to claim 1, wherein the step of providing the negative electrode further includes: performing an activation process on the carbon layer by at least one of an acidic solution and an alkaline solution.

3. The manufacturing method according to claim 1, wherein the step of performing the polarization process is applying an electric field or a magnetic field to the carbon layer.

4. The manufacturing method according to claim 1, wherein the step of performing the polarization process is applying an electric field, a strength of which ranges from 50 V/m to 3000 V/m, to the carbon layer.

5. The manufacturing method according to claim 1, wherein the carbon layer is an activated carbon layer including a plurality of carbon fibers, and after the step of performing the polarization process, the carbon fibers extend substantially along the same direction, with the axial direction thereof substantially parallel to a thickness direction of the carbon layer.

6. The manufacturing method according to claim 1, wherein the carbon layer is a graphene layer or an activated carbon layer, the activated carbon layer including a plurality of carbon fibers or carbon particles.

7. The manufacturing method according to claim 1, wherein the substrate has an uneven surface and the carbon layer covers the uneven surface.

8. The manufacturing method according to claim 1, wherein after the step of assembling the positive electrode, the negative electrode and the proton exchange membrane, the carbon layer is disposed between the substrate and the proton exchange membrane.

\* \* \* \* \*